(12) United States Patent
Wicklund

(10) Patent No.: US 6,295,295 B1
(45) Date of Patent: Sep. 25, 2001

(54) SCHEDULER FOR AN INFORMATION PACKET SWITCH

(75) Inventor: Göran Wicklund, Nacka (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/084,703

(22) Filed: May 26, 1998

Related U.S. Application Data

(63) Continuation of application No. PCT/SE96/01532, filed on Nov. 25, 1996.

(30) Foreign Application Priority Data

Nov. 27, 1995 (SE) .................................................. 9504231

(51) Int. Cl.⁷ .............................. H04L 12/28; H04L 12/56
(52) U.S. Cl. ........................ 370/392; 370/412; 370/428; 710/53
(58) Field of Search ..................................... 370/230, 389, 370/413, 412, 414, 415, 417, 392, 395–399, 390, 418, 419, 428; 340/825.5, 825.51; 710/53

(56) References Cited

U.S. PATENT DOCUMENTS

| | | |
|---|---|---|
| 5,140,582 | 8/1992 | Tsuboi et al. . |
| 5,166,930 | 11/1992 | Braff et al. . |
| 5,270,721 | 12/1993 | Tsukamoto et al. .......... 343/700 MS |
| 5,280,475 | 1/1994 | Yanagi et al. . |
| 5,367,523 | 11/1994 | Chang et al. . |
| 5,517,495 | 5/1996 | Lund et al. . |
| 5,563,613 | 10/1996 | Schroeder et al. ............ 343/700 MS |
| 5,572,691 * | 11/1996 | Koudmani ............................... 710/53 |
| 5,872,769 * | 2/1999 | Caldara et al. ...................... 370/230 |
| 5,910,942 * | 6/1999 | Grenot et al. ........................ 370/236 |
| 5,933,429 * | 8/1999 | Bubenik et al. ..................... 370/392 |
| 5,956,342 * | 9/1999 | Manning et al. .................... 370/414 |
| 6,016,522 * | 1/2000 | Rossum ................................. 710/53 |
| 6,192,422 * | 2/2001 | Daines et al. .......................... 710/53 |

FOREIGN PATENT DOCUMENTS

| | | |
|---|---|---|
| 0 468 413 | 1/1992 | (EP) . |
| 0 541 435 | 5/1993 | (EP) . |
| 0 661 899 | 7/1995 | (EP) . |
| 0 678 996 | 10/1995 | (EP) . |
| 0 705 007 | 4/1996 | (EP) . |
| 0 732 835 | 9/1996 | (EP) . |
| 0 765 068 | 3/1997 | (EP) . |
| 93/07699 | 4/1993 | (WO) . |
| 96/20553 | 7/1996 | (WO) . |
| 97/01920 | 1/1997 | (WO) . |
| 97/29584 | 8/1997 | (WO) . |

OTHER PUBLICATIONS

Japanese Abstract No. 7122930.
"Available Bit Rate Services: The Essence of ATM" StrataCom Service Note ABSRN19515M, (1995).
Prycker, Martin De, portion of "Asynchronous Transfer Mode, solution for broadband ISDN", (Broadband ATM Swtiching), Ellis Horwood series in Computer Communication and Networking; (1991).
Chao, et al., "Generalized Priority Queue Manager Design for ATM Switches", IEEE, (1996).

* cited by examiner

Primary Examiner—Seema S. Rao
(74) Attorney, Agent, or Firm—Burns, Doane, Swecker & Mathis, L.L.P.

(57) ABSTRACT

A method and apparatus schedule transfer of information packets, each information packet switch inlet port being associated with a packet transfer scheduler for scheduling transfer of information packets. A cell is sorted into a first queue structure according to its information packet switch outlet port, and for each outlet port, according to its logical channel.

20 Claims, 9 Drawing Sheets

SCHEDULER FOR AN INFORMATION PACKET SWITCH

This application is a continuation of International Application No. PCT/SE96/01532, which was filed on Nov. 25, 1996, which designated the United States, and which is expressly incorporated here by reference.

TECHNICAL FIELD

The present invention relates to broadband data communication networks and methods. In particular it relates to the aspect of scheduled transfer of information packets.

BACKGROUND

Martin De Prycker: Asynchronous Transfer Mode, solution for broadband ISDN; ELLIS HORWOOD series in Computer Communication and Networking; 1991, describes a fast information packet switch for switching information, i.e. fixed length information packets or cells, from an inlet logical channel to an outlet logical channel. The switch comprises a central switch core to which several switch ports are connected. The switch ports have two distinct functions: inlet functions and outlet functions, however they are typically implemented in the same hardware. A typical fast information packet switch is an ATM switch where ATM stands for Asynchronous Transfer Mode. The inlet/outlet logical ATM channels is defined firstly, by a physical link or physical inlet/outlet, which is defined by a physical port number, and secondly, by a logical channel on the physical port, i.e. a virtual path, VP, and/or a virtual channel, VC, which are identified by a virtual path identifier VPI and virtual channel identifier VCI respectively. To provide the switching function, both the inlet and the incoming logical channel must be related to the outlet and the outgoing logical channel. This is achieved by using a translation table. Moreover, the problem of when two or more logical channels contend for the same outlet at the same time has to be solved. Hence, three functions have to be implemented in a fast information packet switch: routing, for internally routing the information from an inlet port to an outlet port of the switch; queuing, for buffering cells destined to the same outlet at the same time; and header translation.

Until now there have been four types of ATM traffic: Constant Bit Rate CBR, Variable Bit Rate-Real Time VBR-RT, Variable Bit Rate-Non Real Time VBT-NRT and Unspecified Bit Rate UBR. A fifth traffic type, Available Bit Rate ABR, has recently been defined by the International Telecommunications Union ITU and the ATM-Forum as an ATM service category requiring an interaction between the network and the user. A user should be able to send data, i.e. information packets or cells, at the maximum bit rate allowed by the network at any moment. A flow control protocol for this has been defined. Bit rate or just rate is defined as the number of bits per second bit/s.

It has been a goal that all users shall get a fair share of the available bandwidth in the network at any moment. A weight may be assigned to each user, to determine what share of the available bandwidth the user should have. The weight, and thus the bandwidth, may be the same for all users or may vary. Each switching system in the network must allocate bandwidth to each user according to the relative weight, and serve these users according to this weight.

It is assumed that each inlet port has one logical queue per outlet port. When a cell is to be sent into the core, the queue from which to take this cell must be decided, and also which cell in this queue. In order to achieve fairness, i.e. to give each VP/VC a fair share of the available bandwidth from a queue into the switch core, each queue may be searched, e.g. by means of a scanner, and within each queue each VP/VC. There are, at least, two problems with this. A queue scanner must, for each cell interval, select the next queue that has a cell to send and whose outlet port can accept a cell. When an inlet port has been selected, all incoming VP/VC at this inlet port must be searched sequentially in order to give a fair share of the bandwidth of the selected outlet port to each VP/VC.

If the number of ports is large, and the status of each port is tested sequentially until a port that can send a cell is found, the search may take such a long time that it can not be accomplished within the duration of one cell interval, i.e. within the time it takes to send a cell into the switch core. If, for instance, one port can be tested for each byte of a cell, only 60 ports can be tested. If no cell carrying active information is found during this period, an idle cell must be generated. A parallel or serial/parallel search can be made faster, but requires more hardware. Furthermore, as the number of logical channels could be 4000 or more, it is not feasible to actually search all VP/VCs during one cell time in order to find the next to send.

Furthermore, if one inlet carries 10 VP/VCs destined for an outlet, and another inlet only has one, there is a risk that, at least during some period of time, the single VP/VC gets 50% of the outlet bandwidth and the 10 VP/VCs only 5% each.

An ATM switching system supporting ABR and providing a service for queuing per VC is disclosed in a StrataCom Service Note ABRSN19515M, 1995. So as to furthermore ensure fairness in allocating excess bandwidth said ATM switching system also provides a centralized unit common to all inlet ports for rate scheduling per VC. A centralized unit gives an upper limit on the switch size.

An article by Chao et al.: "Architecture Design of a Generalised Priority Queue manager for ATM Switches", ISS-95 proposes a switch comprising means for queue scheduling. The proposed switching system has the buffers at the outlet ports for facilitating the scheduling.

U.S. Pat. No. 5,166,930 describes a method and apparatus for giving data devices efficient access to data resources. A plurality of epoch queues are provided at the input so that a limited number of cells from each connection, depending on the weight of the connection, can be sorted into each queue. An overflow queue is used for cells not allowed in the epoch queues. The epoch queues are then emptied cyclically and cells from the overflow queue are sorted into the free epoch queues together with new incoming cells.

In WO 93/07699 a high speed ATM packet switch using memory buffer modules, each serving a group of inlet ports, is disclosed. Each common memory buffer module includes common buffer memory means for storing incoming cells and buffer managing means for managing the cells to be stored. The system further has a space switch means connected to the memory buffer modules and a system scheduler which configures the space switch and co-ordinates the common memory buffer module at every time slot.

In another embodiment, the system also comprises time slot utilization means which controls the use of the future time slots of each input port and output port, a revolving window priority encoder means for determining the earliest common time slot among the future time slots for connection between an input part and one or more output ports, and a list controller which stores the earliest common time slot together with information about the input port and selected output port and configures the space switch at every time slot according to the header of each cell.

P 661 899 A2 describes a system for using the network resources more efficiently and avoiding loss of cells in overload situations. The first and last cell of a frame of cells are given a start-cell and end-cell flag respectively. A packet counter and a send counter are temporarily assigned to a virtual connection. The start-cell and end-cell signals and the packet counter are used to enable the use of the network resources for another virtual connection when no cells are received for the first virtual connection.

U.S. Pat. No. 5,517,495 discloses a method and an input buffered ATM switch for fast local to wide area networks. The switch includes one input buffer for each input port, with one queue for each virtual connection, and a switch fabric and a scheduling control circuit for controlling the processing of the received cells using a fair arbitration round robin (FARR) program. Each input buffer includes a service list associated with each priority level for each output port, and one cell queue for each virtual connection. Each virtual connection has a time stamp, used to match the input buffers with output ports to control the processing of the received cells.

The method includes the steps of receiving cells in the input buffers, in each input buffer, pre-selecting a virtual connection for each output port, sending the time stamp of each pre-selected virtual connection to a scheduling control circuit, matching the input buffers to the output ports and sending a cell of the corresponding virtual connection through the switching fabric and setting the time stamp of each virtual connection.

EP 678 996 A2 discloses an ATM switch and a method for processing bandwidth requirements solving the problem of statistically multiplexed multicast traffic at a multiplexing point. Each input port comprises one buffer store for each output port. A means for transmitting unicast and multicast traffic is comprised, including an output time slot control means and scheduling means arranged to allocate a time slot for the transmission of each unicast traffic cell, and for calculating when a time slot is available for transmission of a multicast traffic cell. The output time slot control means includes a store for storing information identifying a time slot and for reserving that time slot for the transmission of a multicast traffic cell.

Definitions of Used Terms and Abbreviations
(De Prycker: Asynchronous Transfer Mode, solution for broad-band ISDN; ELLIS HORWOOD series in Computer Communication and Networking; 1991):
ATM: Asynchronous Transfer Mode, i.e. fast packet switching;
Cell: The wording in ATM for a variable or fixed length information packet typically comprising a user information field preferably between 32 and 64 bytes and a control information field, i.e. header, the overall header size for a cell ranging between 2 and 7 bytes, depending on the functions to be provided by the network and standardized by the International Telegraph and Telephone Consultative Committee, CCITT. A fixed length ATM cell has a 48 byte user information field and a 5 byte header field;
Inlet/outlet: physical link;
Inlet/outlet logical channel: inlet/outlet+incoming/out-going logical channel (VP/VC) on that inlet/outlet;
Inlet/outlet port: a packet switch port for receiving/sending cells;
Header translation table: provides the relation between the inlet port/incoming VPI/VCI and the outlet port/outgoing VPI/VCI. Translation is performed at the inlet of the packet switch;
MCR: Minimum Cell Rate, minimum number of cells/cells for a specific logical channel during a predetermined time period.

SUMMARY

It is an object of the invention to provide a means of achieving controllable sharing of the available bandwidth in a fast information packet switch.

It is a further object of the invention to ensure that the available bandwidth is shared in a way which is globally fair by ensuring as far as possible that the outlet bandwidth is shared equally among all logical channels from all inlet ports.

It is still another object to provide a fast information packet switch supporting the service category Available Bit Rate ABR. In a preferred embodiment of the invention, a Minimum Cell Rate, MCR, can be guaranteed for ABR cells.

The invention relates to ABR traffic. Other service classes of traffic, such as CBR, Constant Bit Rate, and VBR, Variable Bit Rate, should also be supported in a fast information packet switch. In an ATM exchange, the queue structure and selection methods according to the invention may be viewed as part of a complete queue structure comprising VBR and CBR queues as well as the inventive ABR queue structure. The VBR and CBR services have priority over the ABR services, so that the bit rate available for ABR cells is reduced when the VBR and CBR traffic increases.

The invention according to the independent claims has the advantage of providing a packet transfer scheduler adapted to an information packet switch for scheduling transfer of information packets. Such a packet transfer scheduler makes it possible to build large packet switches supporting ABR traffic, since the internal operating speed of the switch and the buffers do not depend on the size of the switch.

DETAILED DESCRIPTION

Figure 1:
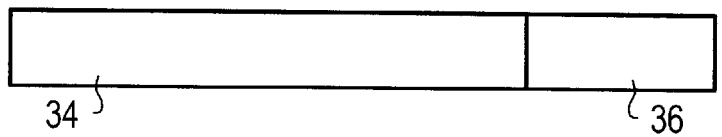
FIG. 1 is a schematic drawing of an information cell normally provided for ATM switches.

FIG. 1 is a schematic drawing of an information packet 32 known per se, comprising a user information field 34 and a control information field 36, called header. The header contains, among other types of information, address and timing information for the cell 32.

Figure 2:
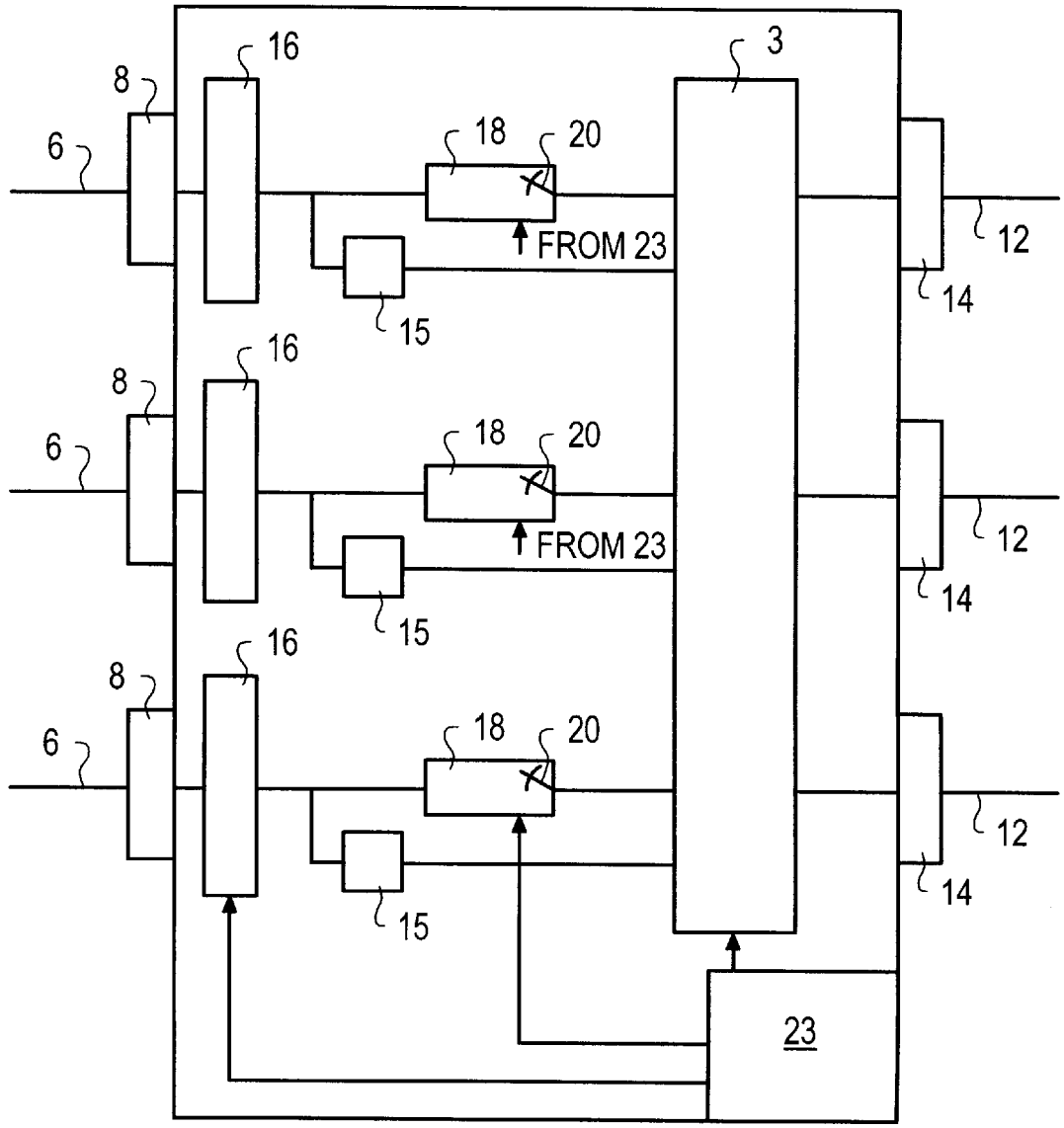
FIG. 2 is a schematic drawing of a packet switch according to an embodiment of the invention.

FIG. 2 is a schematic drawing of a packet switch 2, comprising a packet transfer scheduler according to the invention. A typical fast information packet switch is an ATM switch where ATM stands for Asynchronous Transfer Mode. According to conventional technology, the packet switch 2 switches cells 32 from an inlet logical channel 6 associated with a physical inlet port 8 to an outlet logical channel 12 associated with a physical outlet port 14. The outlet ports are physically connected to other nodes in the network, for example other ATM switches.

The switch 2 in FIG. 2 comprises a central switch core 3 to which several switch ports 8,14 are connected. A header translation table 16 determines the VPI/VCI and the physical outlet port of an incoming cell, and whether the cell is to be transmitted according to variable bit rate, VBR, constant bit rate, CBR, or available bit rate, ABR. If the cell is to be transmitted according to CBR or VBR, it is transferred to the VBR and CBR queue structures 15, which are here shown as one unit for each inlet port 8 for clarity reasons. They could also be implemented as two units for each inlet port 8, or as one or two units common to all inlet ports 8.

According to the invention, the switch also comprises a packet transfer scheduler 18, which allows for transmission of cells according to Available Bit Rate (ABR). There is one packet transfer scheduler 18 for each inlet port in the switch.

According to an embodiment of the invention, the packet switch 2 further comprises controlling means 23 for assigning a weight to each logical channel (VP/VC), depending on e.g. the requirements of the source and the general traffic of information packets through the switch. As common in the art, the controlling means 23 also sets up the header translation tables 16.

An incoming cell is received at an inlet port 8. As in prior art technology, header translation table 16 determines the logical channel code VPI/VCI and the outlet port of the cell 32 depending on the control information in the header field 36 of the cell 32. However, it is not important for this invention where in the switch the header translation is done. According to the invention, the cell is then transferred to a packet transfer scheduler 18 connected to the inlet port 8.

Figure 3:
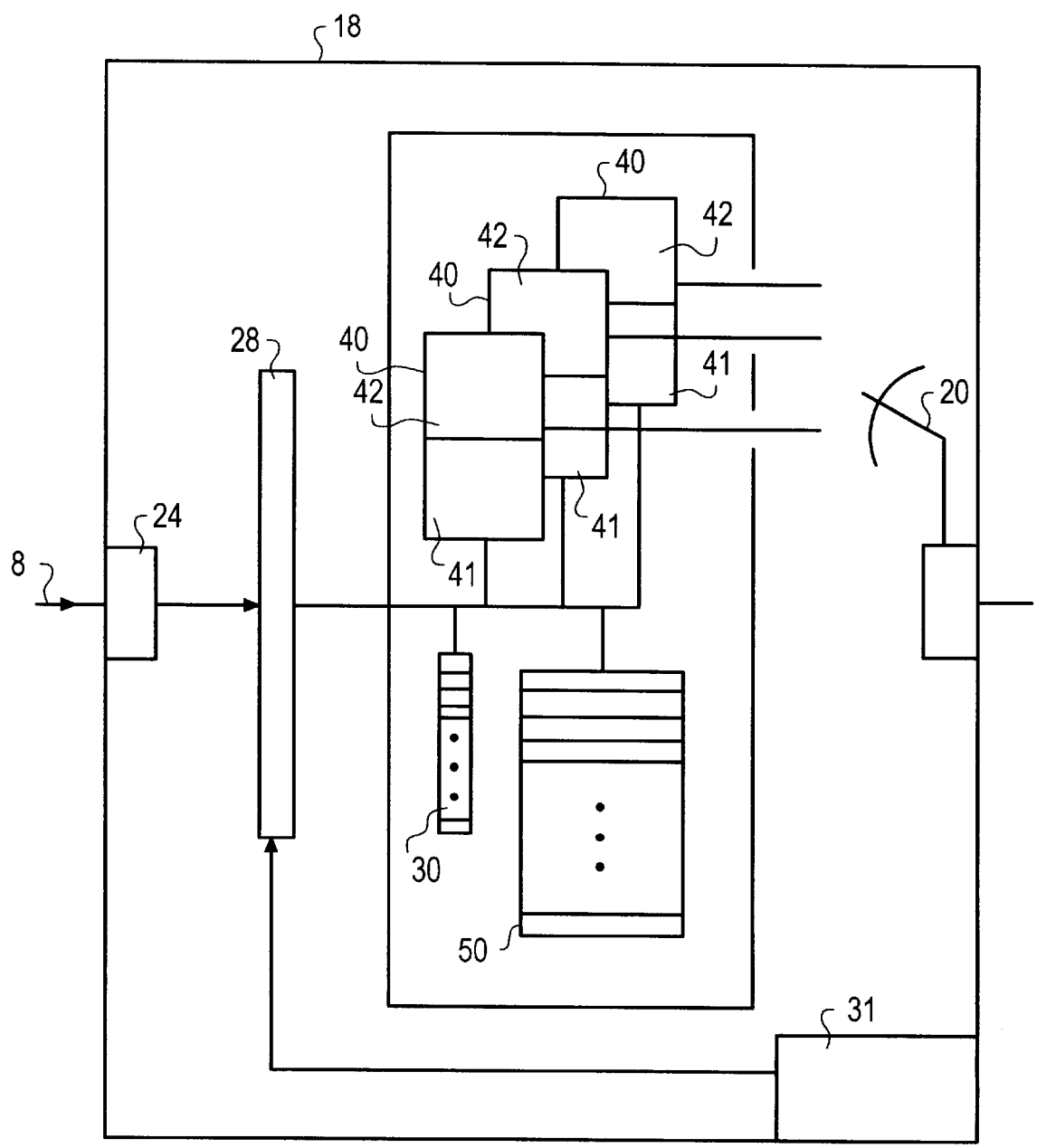
FIG. 3 is a schematic drawing of a packet transfer scheduler according to an embodiment of the invention.

The packet transfer scheduler 18, shown in detail in FIG. 3, sorts the received cells 32 into a first queue structure 40 according to their outlet. The cells then continue to the switch core 3 via a first selector 20 which selects at least one cell 32 from the packet transfer scheduler 18. The switch core 3 has buffers in the way common in the art, to avoid loss of cells if cells from two or more inlet ports 8 are sent to the same outlet port 14 at the same time. The controlling means 23, e.g. a central processor unit, CPU, also communicates with the packet transfer scheduler 18.

In the case the inlet port 8 is a separate unit in terms of hardware, the inlet port then comprises a scheduler 18, the scheduler 18 receiving a cell by means of a receiving means 24. The outlet port has already been determined by the header translation table 16. The controlling means 31, which may be a microprocessor such as Motorola 68360, is then adapted to receive the weight assigned to each logical channel (VP/VC). It is to be noted that, as an alternative, the controlling means 31 could be a part of the controlling means 23, which could comprise a CPU common to the whole switch.

Returning to FIG. 3, the scheduler 18 comprises a first queue structure 40 for each outlet port, into which the cells are sorted according to their outlet port. The scheduler further comprises means 28 for sorting said cell 32 into the appropriate first queue structure 40.

Figure 4:
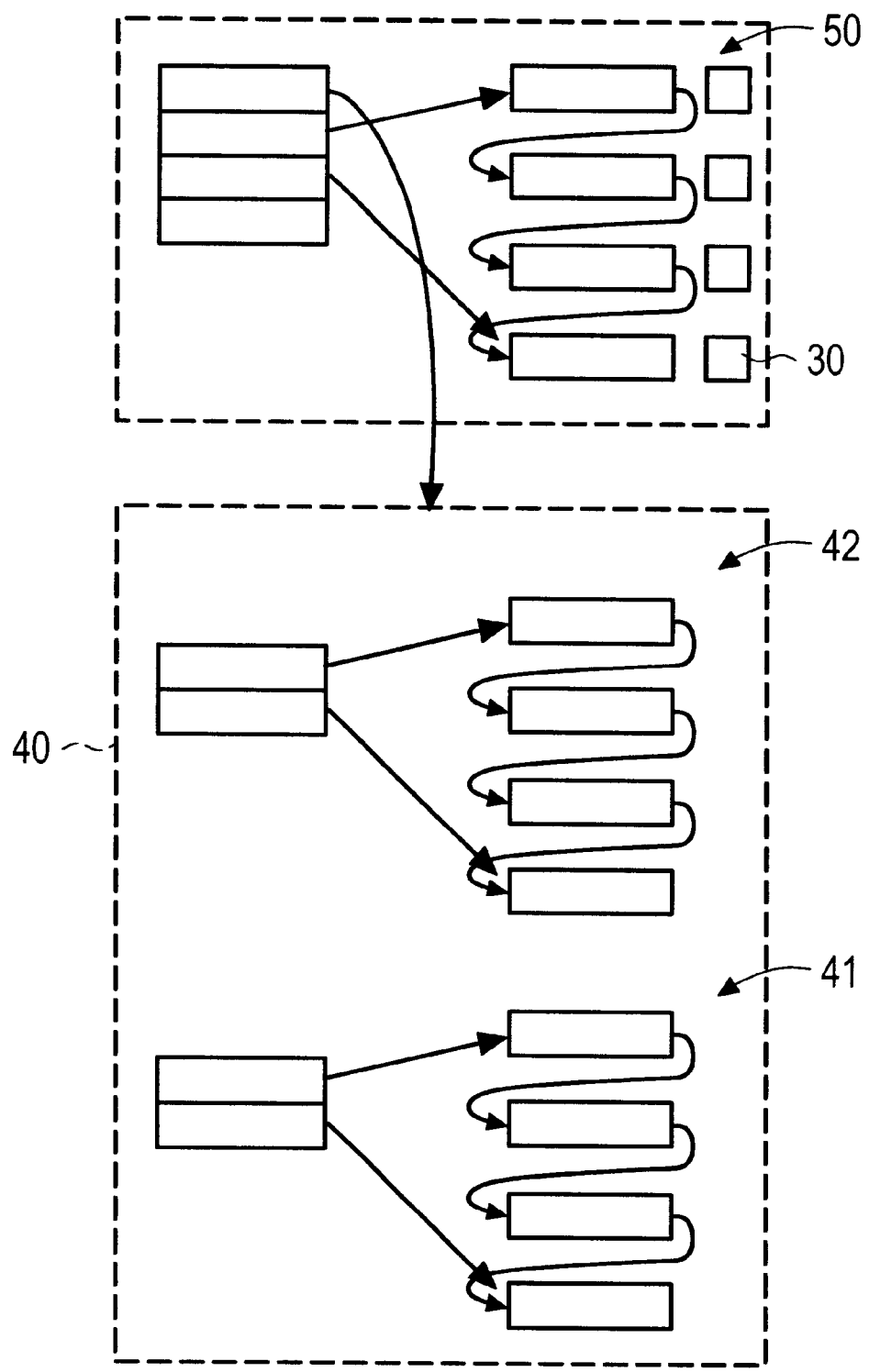
FIG. 4 is a schematic diagram of queue structures according to a preferred embodiment of the invention.

FIG. 4 is a schematic diagram of a queue structure according to a preferred embodiment of the invention. The first queue structure 40 comprises two subqueue structures, Next 41 and Current 42. In each scheduler 18, there is one pair of current and next queues for each outlet. Current 42 is the queue from which cells are currently being read, while the sorting means 28 sorts the received cell 32 into Next 41. When all cells have been read from Current 42, the subqueue structures Next 41 and Current 42 are swapped, so that Next becomes the new Current, from which cells are read, and the empty Current becomes the new Next, into which cells are read.

Each scheduler 18 also comprises a second queue structure 50, called VPI/VCI-list of cells 32, that is, one queue for each VP/VC in the exchange, into which the cells 32 are sorted by sorting means 28 according to the logical channel code VPI/VCI of each cell 32. This queue structure 50 is used when the incoming cell has a VPI/VCI for which there is already a cell in Next 41. The sorting means 28 also transfers cells from the VPI/VCI-list 50 to the first queue structure 40.

Figure 5A:
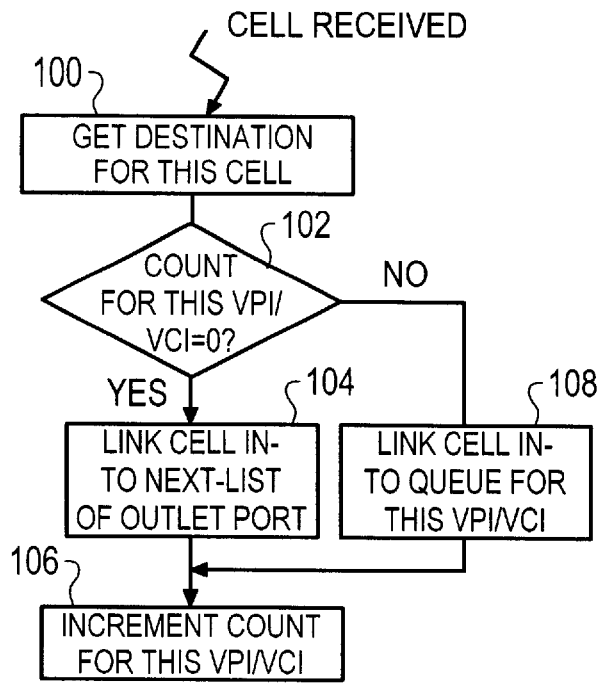
FIG. 5A is a flow diagram of actions taken when a cell is received at packet transfer scheduler according to a first embodiment of the invention.
Figure 5B:
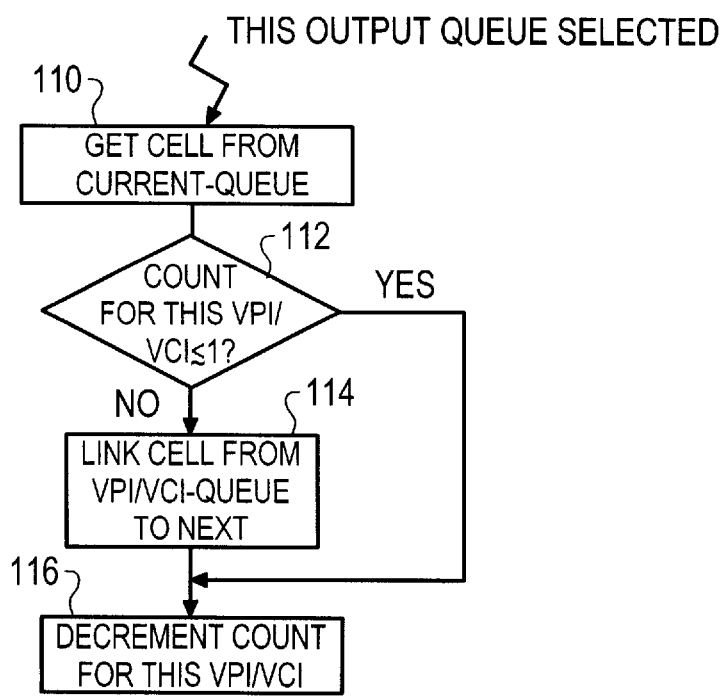
FIG. 5B is a flow diagram of actions taken when a cell is transferred from a packet transfer scheduler to a selected outlet port according to a first embodiment of the invention.

The scheduler comprises a counter 30 for counting the number of cells 32 sorted into the queue structures 40 and 50. The counter has one register for each VPI/VCI, see FIG. 5A.

First suppose that the queues are empty, so that all counters are set to zero. When a first cell 32 with a first VPI/VCI and a first outlet port 14 arrives, it is placed in the Next 41 queue for that outlet port, and the counter for that VPI/VCI is incremented, i.e. set to 1. When a second cell 32 with the same outlet port 14 but with a second VPI/VCI arrives, it is placed in the same Next 41 queue, and the counter for the second VPI/VCI is incremented, i.e. set to 1. Next, suppose that a third cell 32 with the same VPI/VCI and outlet port 14 as the first cell arrives. The counter for this VPI/VCI is 1, indicating that there is already a cell for this VPI/VCI in Next. Therefore, the incoming cell is sorted into the second queue 50 for the first VPI/VCI, and the counter is incremented, i.e. set to 2.

The queue structures Next 41, Current 42, and VPI/VCI-list 50 are preferably dynamically linked lists of cells 32 in a common RAM.

In order to achieve global fairness, all Current 42 and Next 41 of all inlets that are dedicated for the same outlet port, should preferably logically be linked into one, so that all Current 42 for that outlet port are emptied before any input starts with Next 41 for the same outlet port.

Figure 8:
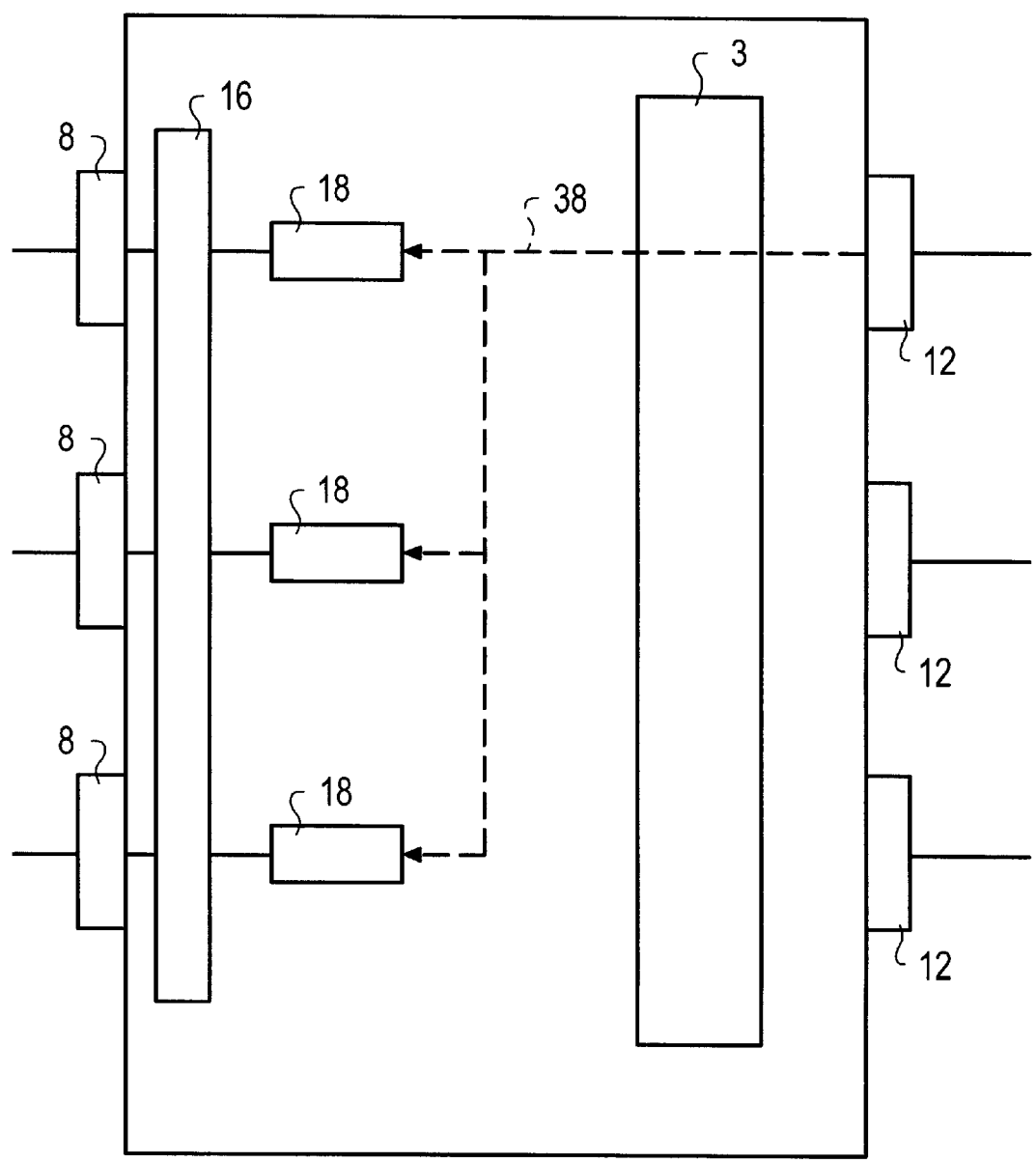
FIG. 8 is a schematic drawing of how the Start_Of_List signal is transmitted from the outlet port to the inlet ports according to an embodiment of the invention.

As shown in FIG. 8, when the Current queue consisting of all Current 42 queues for an outlet 14 is empty, and the outlet port is ready to receive more cells, it sends a Start_Of_List signal 38 to all queues corresponding to that outlet. The switch 3 may multiplex all Start_Of_List signals from all outlet ports 12 to one All_Start_Of List signal which is distributed to all inlet ports 8.

When the Start_Of_List signal is received, Next 41 and Current 42 are swapped as explained above. The new Current 42 receives cells from the VPI/VCI-list 50 or directly from the inlet port, if the VPI/VCI-list 50 is empty for a particular VP/VC. The swap between Next 41 and Current 42 is carried out by the selector 20.

To ensure that all Current 42 lists for an outlet are read before any scheduler swaps Next and Current, the information packet scheduler at each inlet port informs the outlet port about the length of Current 42. This can be done either as an explicit value in the last cell sent from Current 42 or by one single bit marker in the last cell. In the first case, the cell must contain an extended header, containing among other things, this value. In the latter case, the outlet port must count the number of cells between two marked cells. This procedure is well-known to the person skilled in the art.

Another preferred embodiment of the invention takes into account the general case that the VP/VCs do not have an equal share of the bandwidth. A weight is assigned by means of the controlling means 23 (FIG. 2) to give a logical channel (VP/VC), for example, 10 times more bandwidth than another logical channel. This can be done by letting different logical channels have different number of cells linked to Next 41 (FIG. 3). As before, the VPI/VCI counter 30 for each logical channel keeps track of the number of cells in the queue structure 40, 50. In this embodiment, the counter must have two registers for each VPI/VCI: one for counting the number of cells in the first queue structure 40 and one for counting the number of cells in the second queue structure 50.

In this case, cells can be placed in Next 41 as long as the counter 30 is below some predetermined limit, i.e. a maximum value, defined by the relative bandwidth (not shown).

When the counting means has reached the maximum value for this VPI/VCI, further cells for that VP/VC are sorted into the VPI/VCI list 50.

The outlet port adds up the number of cells received from all inlet ports to get the total length of all the received Currents 42 taken together. There is a status marker for each inlet, an inlet counter to keep track of what inlets have packets to send to that outlet, and a means for calculating the total length Sum of all received Currents 42. These were reset to zero after the preceding calculation of the total lengths of each Current 42 for a particular output.

Figure 6A:
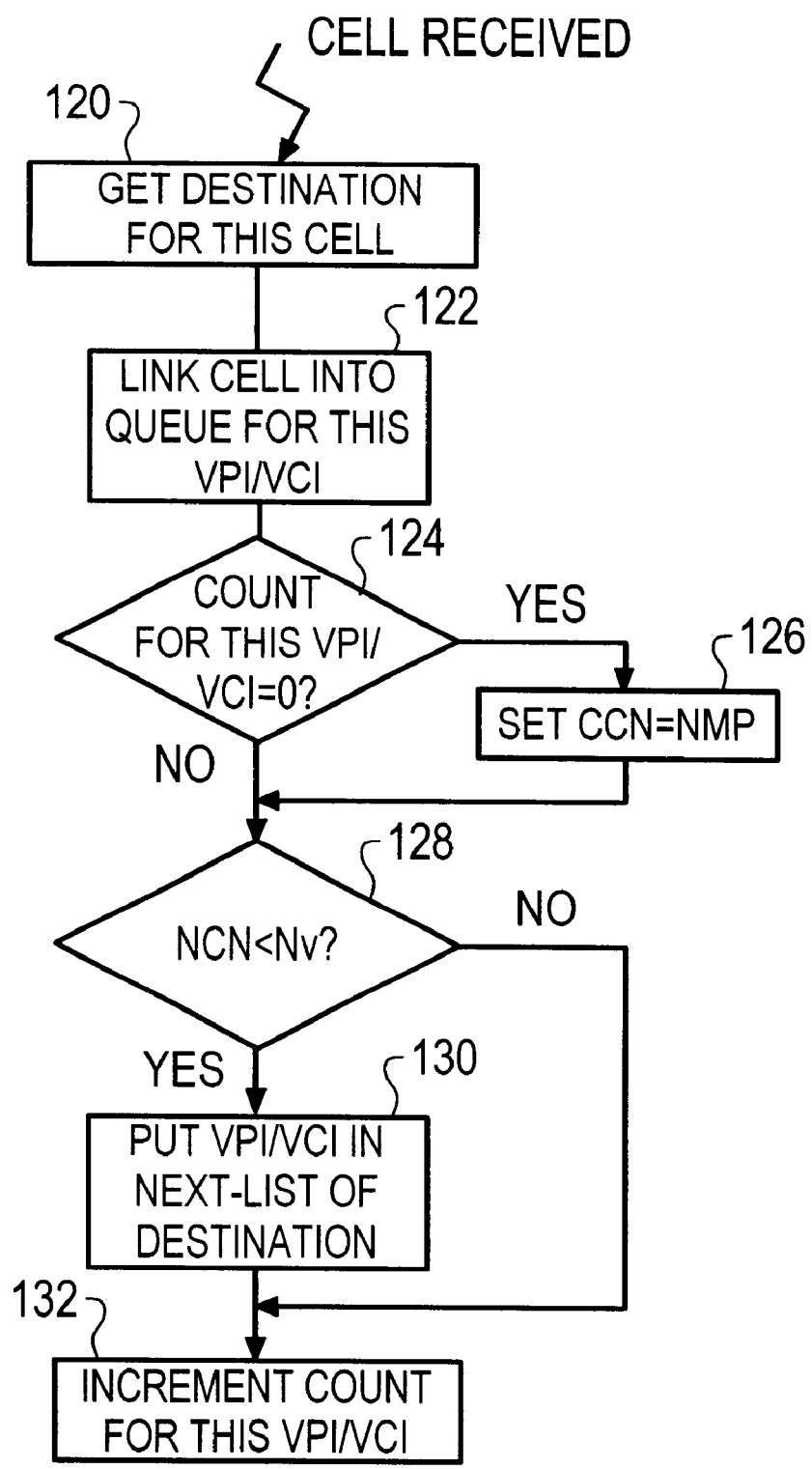
FIG. 6A is a flow diagram of actions taken when a cell is received at packet transfer scheduler according to a second embodiment of the invention.
Figure 6B:
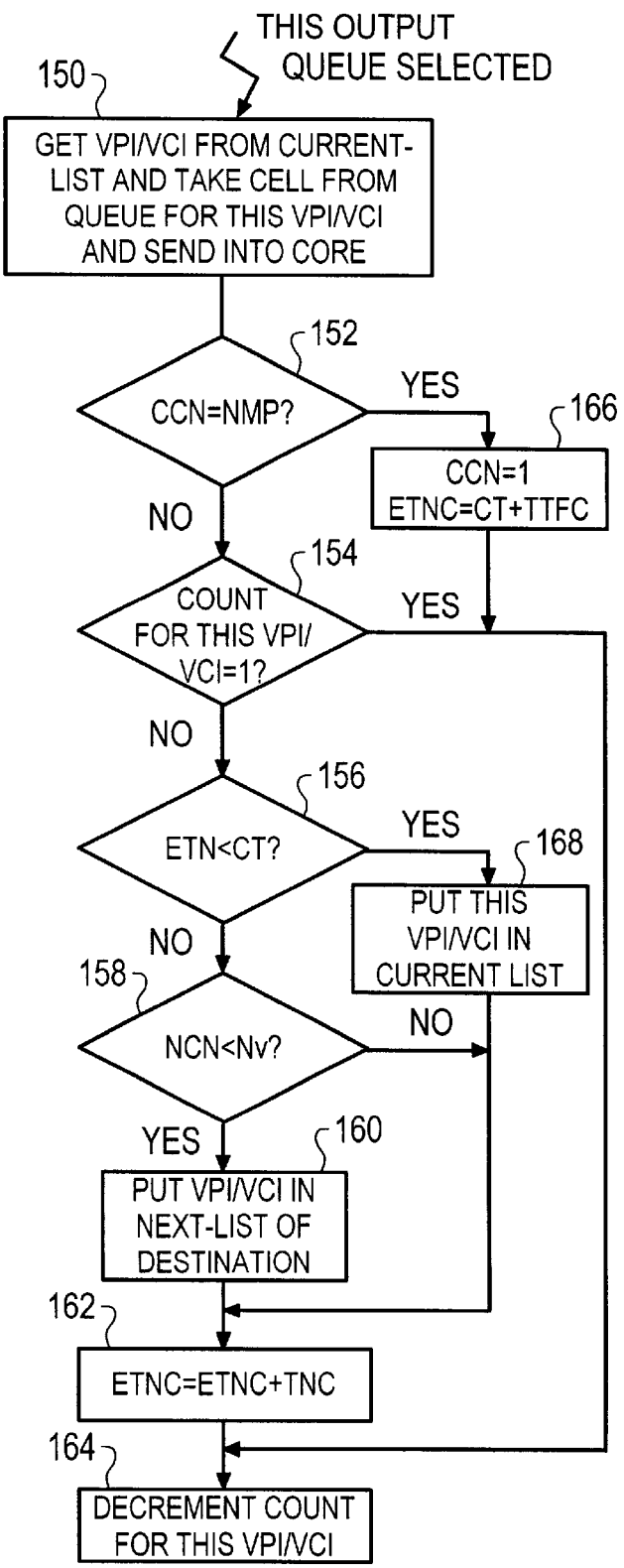
FIG. 6B is a flow diagram of actions taken when a cell is transferred from a packet transfer scheduler to a selected outlet port according to a second embodiment of the invention.

FIG. 6A and FIG. 6B are flow diagrams of actions taken when a cell is received at and selected from a packet transfer scheduler according to a first embodiment of the invention. In this embodiment it is assumed that the VP/VCs all have the same weight. The steps in the flow diagram of FIG. 6A are preferably performed by the determining means 26 and the sorting means 28, and the steps in the flow diagram of FIG. 6B are performed in the second selecting means 20.

First, suppose that when a first cell with a first VPI/VCI and first outlet port, enters the inlet port:
Step 100: Get the destination of the cell and determine the value of the VPI/VCI counter 30 for the first VPI/VCI
Step 102: If the counter value is zero, go to step 104, otherwise, go to step 108.
Step 104: Link the cell into Next 41 for the first outlet.
Step 106: Set the counter 30 for the first VPI/VCI to 1.
Step 108: Link the cell into the second queue 50 according to its VPI/VCI. Continue with step 106.

In FIG. 6B the cells are read to the outlet port 14 as follows:
Step 110: The selecting means 20 selects, for transmitting into the core 3, a first cell having a first VPI/VCI and a first outlet port.
Step 112: Is the counter 30 for the first VPI/VCI equal to or less than 1? If no, then go to step 114 otherwise go to step 116.
Step 114: Link a cell from first VPI/VCI-queue into Next 41.
Step 116: Decrement the counter 30 for the first VPI/VCI queue.

This procedure ensures that one cell is taken from each active VPI/VCI-list 50, which gives a fair share of the bandwidth to each logical channel.

Figure 7:
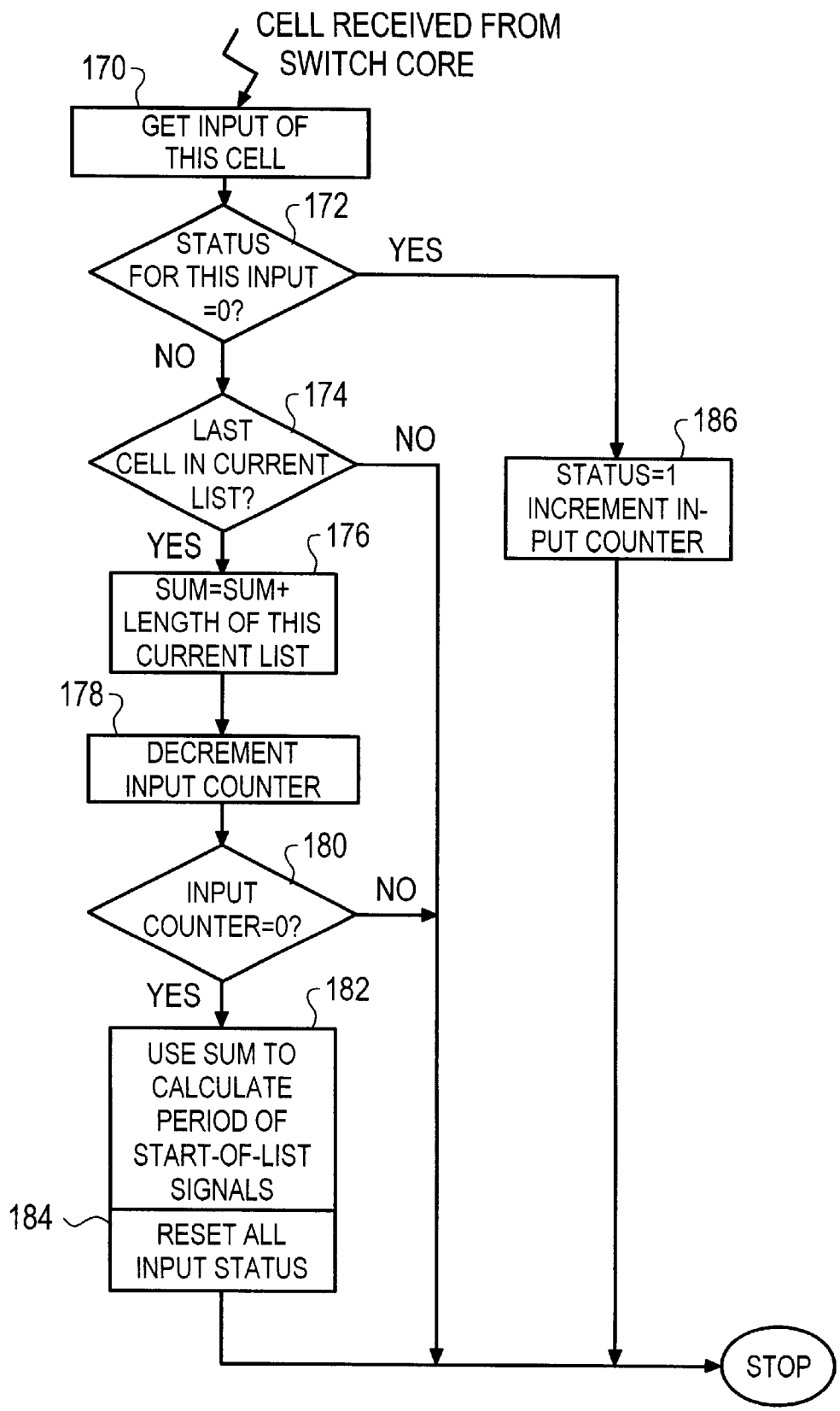
FIG. 7 is a flow diagram of actions taken for calculating a cell transfer rate for transferring cells from a packet transfer scheduler to a selected outlet port according to an embodiment of the invention.

FIG. 7A and FIG. 7B are flow diagrams of actions taken when a cell is received at and selected from a packet transfer scheduler according to a second preferred embodiment of the invention, taking into account different weights for different logical channels, VP/VC, and also Minimum Cell Rate MCR requirements.

Values Used in Flow Chart

Count is the number of cells in the queue structure for a particular VP/VC
Nv is the weight for this VP/VC
NCN=number of cells/cells in Next 41 for a specific VP/VC If the rate at which cells from a certain VP/VC are selected from Current 42, is below the Minimum Cell Rate MCR specified for that VP/VC, an extra cell is sorted into Current 42, giving more bandwidth to that VP/VC. In order to control this, some extra parameters for each VP/VC are needed:
NMP—length of cells during a measurement period
CCN—current cell number
TFC—time to first cell in a measurement period
TNC—maximum time to next cell
ETNC—expected time for next cell In addition, a common time, Current Time CT, is used. The values NMP, TFC and TNC are chosen so that:

$$NMP/((NMP-1)*TNC+TFC)>MCR$$

In FIG. 7A, a cell is read into the queue structures 40, 50 in the following steps:
Step 120: A cell with a specific VPI/VCI and outlet port is received at the inlet port.
Step 122: Link the cell into the queue for this VP/VC.
Step 124: Is the counter for this VPI/VCI 0? If yes, then go to step 126, otherwise go to step 128.
Step 126: Set CCN=NMP. (It is to be noted that when the first cell of a VP/VC is received, i.e. the VCI-VPI-list 50 is empty, CCN was set to equal NMP in order to start a new measurement period.)
Step 128: If NCN is lower than Nv, then go to step 130, otherwise go to step 132.
Step 130: Link the cell into Next 41.
Step 132: Increment the counter for this VPI/VCI.

In FIG. 7B, a cell is read to the outlet port in the following steps:
Step 150: A first VPI/VCI is selected from Current 42 and sent into the core.
Step 152: If CCN=NMP, then go to step 166, otherwise go to step 154.
Step 166: Set CCN=1 and ETNC=CT+TFC. Go to step 164.
Step 154: If count for this VPI/VCI=1, then go to step 164, otherwise, go to step 156.
Step 156: If ETN<CT, then go to step 168, otherwise, go to step 158.
Step 168: Put the VPI/VCI in the Current list. Go to step 162.

Step 158: If NCN<Nv, then go to step 162, otherwise go to step 160.
Step 160: Put VPI/VCI in the Next list for the destination.
Step 162: Set ETNC=ETNC+TNC.
Step 164: Decrement the counter.

Hence, when the first cell with a specific VPI/VCI is read from Current 42, a measurement period is started, as CCN is set to 1 and ETNC is set to CT plus TFC. This is repeated until NMP cells have been read out. Each time a cell is read from Current 42, a new ETNC value is calculated by adding TNC to the previous ETNC. The reason for having different TFC and TNC is to be able to supervise any MCR value, and to allow for some variation of the time between two successive cells even if the actual cell transfer rate is MCR, supposing TFC>TNC.

When the next cell with this VPI/VCI is read out, the ETNC is compared to CT, before it is updated, and if ETNC is lower than CT, then a cell is put into Current 42, instead of into Next 41.

Furthermore, in order to preserve sequence number integrity, Current 42 and Next 41 should not contain pointers to the actual cells, but only their VPI/VCI value. When such a value is read out from Current 42, the cell is taken from the queue for that VPI/VCI. Current 42 and Next 41, one of each for each destination, can be built up using linked lists of VPI/VCI values, or by allocating a fixed memory space for each list, and putting the VPI/VCI values in consecutive positions in that memory space.

FIG. 8 is a flow chart of the actions taken at the outlet port for calculating a selecting rate for selecting cells in a packet transfer scheduler for sending into the switch core according to an embodiment of the invention.

Step 170: A first cell of a Current 42 is received from the core, and the inlet port is determined by e.g. a source address in the header 36 of the cell 32.
Step 172: If the status for this input is 0, then go to step 186, otherwise go to step 174.
Step 174: If this is the last cell in the current list, then go to step 176, otherwise end.
Step 176: Set sum=sum+length of Current list.
Step 178: Decrement this input counter
Step 180: If the input counter equals 0, then go to step 182, otherwise, end.
Step 182: Use sum to calculate the period of the Start_Of_List signals.
184: Reset all input status.
Step 186: Set the status marker for that inlet 1, and the inlet counter is incremented by one.

In order to calculate a selecting rate called list-rate, the outlet port measures the time it takes to send out sum number of ABR cells on the link. This time depends on the momentary Constant Bit Rate CBR and Variable Bit Rate VBR traffic there is on this link. CBR and VBR have priority over ABR cells.

This time is then used as the interval at which the outlet is to send Start_Of_List signals back to the inlets port to initiate a swap of Next 41 and Current 42 for that outlet in all schedulers 18. The signal can be sent to the inlet ports as separate point-to-multipoint cells carried in normal traffic cells, or sent via a separate communication mechanism. When the signal is carried in a normal traffic cell, only one bit is required. How to send these signals is well-known to the person skilled in the art.

Referring back to FIGS. 2 and 3, in a preferred embodiment of the invention there is at each inlet a packet transfer scheduler 18 comprising a queue structure Current 42 for each outlet. The selecting means 20, e.g. a scanner, in each packet transfer scheduler 18 will select one cell from each Current 42 in order. If the scanner 20 encounters the last cell of one Current 42, it will then exclude that list from the scanning. When a packet transfer scheduler 18 receives a Star_Of_List signal from an outlet port, Next and Current for that outlet port will be swapped and the scanner will take cells from the new Current 42. The scanner contains a list of all Current 42 queues from which it will currently take cells. Cells are taken from Current 42 in the order they appear in the scanning list. When a cell has been taken from Current 42, the number of this list is put back in the scanning list, unless the cell was the last from Current 42. When a Start_Of_List signal is received from the one outlet, the number of the corresponding Current 42 is put back into the scanning list.

According to another embodiment each inlet sends out a co-ordination packet to all other inlets when it has finished Current 42. It starts with Next 41 only when an inlet has received such a cell from all other inlets.

According to yet another embodiment the outlet collects the co-ordination packets from the inlet, and sends out a Start_Of_List signal to all inlets when it has received all co-ordination packets or, alternatively, the last cell sent from Current 42 has a marker in its extended header, provided by the controlling means 31. In this way the bandwidth used by the co-ordination packets is reduced.

The selecting rate list-rate is calculated by an outlet port as the inverse of the Start_Of_List interval and can be used as the fair share of bandwidth for a specific VCI, adjusted with its relative weight.

Figure 9:
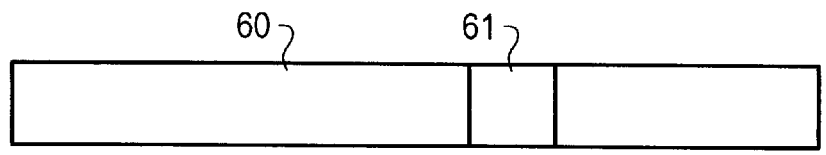
FIG. 9 shows an RM cell used for transmitting to the end user the rate at which information may be sent to the switch, according to an embodiment of the invention.

The ABR protocol defines a regular RM cell 60 associated with each connection. As shown in FIG. 9, the RM cell 60 contains a field called Explicit Rate ER 61, which tells the end user at which rate it should send cells into the network. RM cells are generated by the sender and returned by the receiver. The ER may be modified by the receiver, and by each switch it passes on the way back to the sender.

Figure 10:
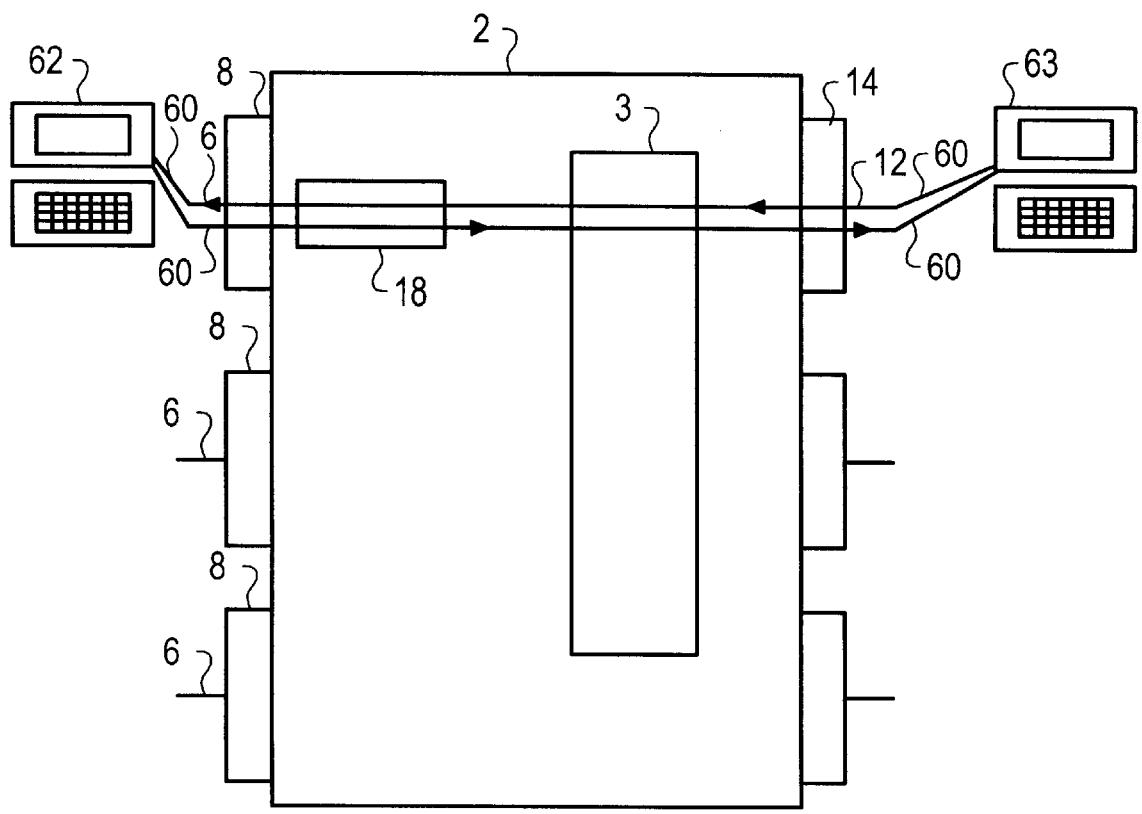
FIG. 10 shows how the RM cell shown in FIG. 9 is transmitted to the end user.

FIG. 10 shows how an RM cell 60 is transmitted from a sender 62 through the switch 2 to a receiver 63 and back through the switch 2 to the sender 62, or source of the signal, here shown as a computer sending data through the telecommunications network via the switch. When a backward RM cell is passing an "inlet port" 8, the port can modify the ER 61 in it by taking the list-rate it is currently using when sending cells to the outlet port 14 from which this RM cell 60 came, and multiply it with the relative rate.

The ER 61 is only modified if the calculated rate is below the one already carried in the RM cell 60.

According to a further embodiment the outlet informs the inlet about the number of Current 42 per time unit they are allowed to send, the list-rate, which is the same number for each inlet.

The switch core contains a limited number of outlet buffers in order to accept cells from several different inlets addressed to the same outlet at the same time. When such an outlet buffer gets filled up, a back pressure signal is sent from the core so that an inlet port does not send any more cells to this selected outlet port until the buffer at the outlet is empty again as is well-known to the person skilled in the art.

When a cell is to be sent into the core, it may have happened that a back-pressure signal from the core has been received, indicating that it is not possible to send the cell to its destination outlet. In that case, the cell is not sent, and Current 42, from which the cell arrived, is not put back into the scanning list until the back-pressure ceases.

What is claimed is:

1. A method for the scheduled transfer of an information packet through an information packet switch, from one of a number of inlet ports to one of a number of outlet ports, said method comprising:
   a) determining the outlet of the packet; and for each inlet port;
   b) sorting the information packet into a first queue structure individual for a specific outlet port by a packet transfer scheduler for said inlet port of the packet, said scheduler having at least one queue structure per outlet port of the packet switch;
   c) selecting at least one packet from the first queue structure to be sent to the output port, the first queue structure having at least a first substructure and a second substructure, the sorting of the incoming packet being done into the first substructure, and the selecting of the at least one packet to be sent to the output port being done from the second substructure;
   d) swapping said first and second substructures of the first queue structure when the second substructure is empty and the outlet port is ready to receive more packets, such that the sorting of the incoming packet will be done into the second substructure and the selecting of packets to be sent to the output port will be done from the first substructure; and
   e) sending a Start_Of_List signal from each of the outlet ports to all first queue structures for this outlet port after receiving the packets having the destination through this port to all the inlet ports to initiate the swap of the first and second substructures of the first queue structures for that output port.

2. Method according to claim 1, further comprising the step of sorting the incoming packet into a second queue structure having one queue per a logical channel code, if packets with the same channel code are currently in the first substructure.

3. Method according to claim 2, further comprising transferring said first packet with the same channel code as the packet being transferred from the first queue structure to the outlet port, from the second queue structure to the first substructure of the first queue structure, if there are packets in the second queue structure with the same channel code.

4. Method according to claim 1, further comprising the step of counting by means of a counting means having at least one register per a said determined logical channel code, each being incremented when a new packet having its determined logical channel code enters its queue structure and decremented when a packet with its determined logical channel code leaves its queue structure.

5. Method according claim 1, further comprising the step of assigning a minimum packet transfer rate to each logical channel, said minimum packet transfer rate being used to determine a maximum value of the counting means, and hence the number of packets to be transferred on a selected logical channel during a predetermined time period, to allow more than one packet to be sorted into the first substructure for the logical channel code according to the bandwidth of the logical channel.

6. Method according to claim 5, wherein if the number of cells in the first queue structure for a certain logical channel equals said maximum value, further incoming cells are sorted into a second queue structure according to the determined logical channel code.

7. Method according to claim 4, wherein a weight is assigned to each logical channel which defines the relative bandwidth of the logical channel, and a cell is sorted from the inlet port or from a second queue structure into said first queue structure, as long as the value of a count of the counting means for the logical channel code of said packet is lower than a maximum value of said logical channel code.

8. Method according to claim 1, further comprising determining a selecting rate as the inverse of the time it takes for said selected outlet port to send a number of cells sorted according to said selected outlet port in each first queue structure for all packet transfer schedulers.

9. Method according to claim 1, wherein said queue structure is a dynamically linked list of cells.

10. A packet transfer scheduler for scheduling the transfer of information packets through an information packet switch from one of a number of inlet ports to one of a number of outlet ports, comprising:
   a) means for determining the outlet port and logical channel code of an incoming packet, and for each inlet port
   b) a first queue structure for each outlet port,
   c) means for sorting said packet into said first queue structure,
   d) means for selecting at least one packet from said first queue structure to be transmitted to the outlet port, wherein the first queue structure comprises at least a first substructure into which incoming packets are sorted, and a second substructure from which outgoing packets are selected, and
   e) means for swapping said first substructure and said second substructure when the second substructure is empty and the outlet port is ready to receive more packets, such that the incoming packets are sorted into the second substructure and the outgoing packets are selected from the first substructure,
   wherein the means for swapping said first and said second substructures is triggered by a Start_Of_List signal sent from each outlet port to all inlet ports simultaneously.

11. Packet transfer scheduler according to claim 10, further comprising a second queue structure having one queue for each logical channel code into which incoming packets are sorted according to their logical channel code, and means for sorting said packet into the first substructure or said second queue structure.

12. Packet transfer scheduler according to claim 11, further comprising means for transferring a packet from said second queue structure into said first queue structure.

13. Packet transfer scheduler according to claim 10, further comprising counting means having at least one register for each logical channel code for counting the number of packets in the queue structures for each logical channel code, the counting means being incremented when a new packet enters the queue structures and decremented when a packet leaves the queue structures.

14. Packet transfer scheduler according to claim 13, further comprising means for assigning a minimum packet transfer rate to each logical channel, said minimum packet transfer rate being used to determine the maximum value of the counting means and thus the number of packets to be transferred on a selected logical channel during a predetermined time period, to allow more than one packet to be sorted into the Next substructure for a logical channel code according to the bandwidth of the logical channel.

15. Packet transfer scheduler according to claim 10, wherein if a calculated packet transfer rate is higher than the predetermined packet transfer rate for a logical channel, the sorting means sorts a subsequently incoming packet of the same logical channel into the second queue structure.

16. Packet transfer scheduler according to claim 14, further comprising means for assigning a weight to each logical channel, defining the relative bandwidth of the logical channel, so that packets from the inlet port or from a second queue structure may be sorted into said first queue structure, as long as the value of said counting means for the logical channel code of said packet is lower than a maximum value of said logical channel code.

17. A Packet transfer scheduler according to claim 10, further comprising means for determining a selecting rate as the inverse of the time it takes for said selected outlet port to send the number of packets sorted according to said selected outlet port in each first queue structure for all packet transfer schedulers.

18. Packet transfer scheduler according to claim 10, wherein said queue structures are dynamically linked lists of packets.

19. An information packet switch for switching information packets, comprising:

means for assigning a weight to a logical channel, and a packet transfer scheduler for scheduling the transfer of information packets through an information packet switch from one of a number of inlet ports to one of a number of outlet ports, the packet transfer scheduler including a) means for determining the outlet port and logical channel code of an incoming packet, and for each inlet port
   b) a first queue structure for each outlet port,
   c) means for sorting said packet into said first queue structure,
   d) means for selecting at least one packet from said first queue structure to be transmitted to the outlet port, wherein the first queue structure comprises at least a first substructure into which incoming packets are sorted, and a second substructure from which outgoing packets are selected, and
   e) means for swapping said first substructure and said second substructure when the second substructure is empty and the outlet port is ready to receive more packets, such that the incoming packets are sorted into the second substructure and the outgoing packets are selected from the first substructure, wherein the means for swapping said first and said second substructures is triggered by a Start_Of_List signal sent from each outlet port to all inlet ports simultaneously.

20. The information packet switch according to claim 19, wherein said information packet switch is included in an asynchronous transfer mode network.

* * * * *